(Model.)
A. R. P. ROBINSON.
ROTARY EGG PRESERVER.
No. 271,658. Patented Feb. 6, 1883.
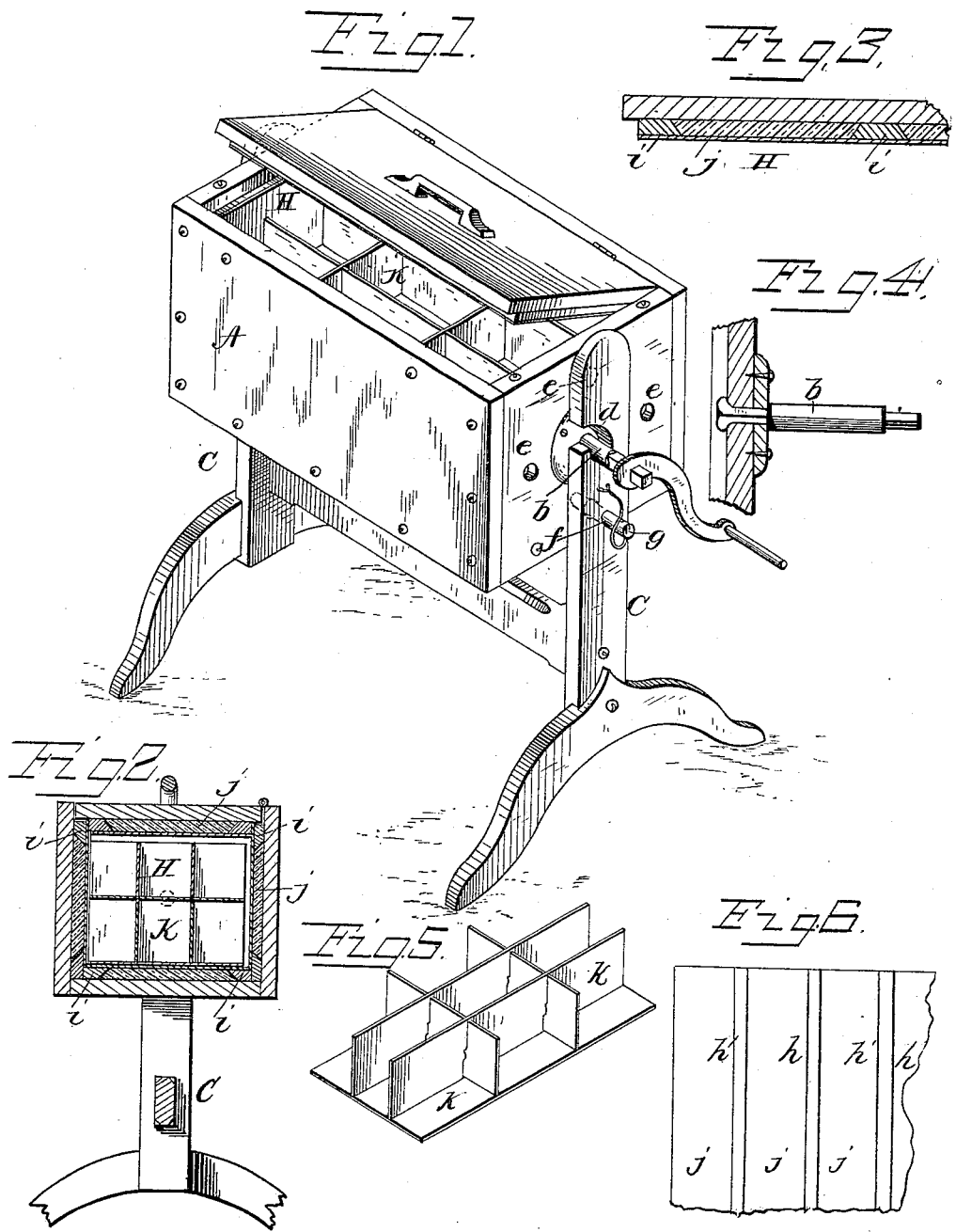
WITNESSES
Franck L. Ourand
C. J. Williamson
Alba R. P. Robinson, INVENTOR.
by
John J. Halsted & Son, Attorneys

UNITED STATES PATENT OFFICE.

ALBA R. P. ROBINSON, OF NORTH WALPOLE, NEW HAMPSHIRE.

ROTARY EGG-PRESERVER.

SPECIFICATION forming part of Letters Patent No. 271,658, dated February 6, 1883.

Application filed April 21, 1882. (Model.)

*To all whom it may concern:*

Be it known that I, ALBA R. P. ROBINSON, a citizen of the United States, residing at North Walpole, in the county of Cheshire and State of New Hampshire, have invented certain new and useful Improvements in Rotary Egg-Preservers; and I do hereby declare the following, in connection with the accompanying drawings, to be a full, clear, and exact description of the invention, such as will enable others skilled in the art to which it appertains to make and use the same.

Eggs need for their preservation not only to be kept comparatively cool, but also to be at times changed in their positions, so that the inner skin or lining, which lies next the shell and separates it from the albumen and yolk, may not become dried and contracted at any point, and thus permit the air to penetrate through the air cells of the shell and through this lining.

My invention has for its object the preserving of eggs for any desired length of time by means of an apparatus of novel construction, whereby large numbers of them, while being kept cool, may also all have their positions changed at will as often as may be desired, to prevent the contents of the shell from settling.

The invention consists in an apparatus, which I will now describe, and in certain details of its construction, the leading features being a cooling receptacle or case for holding the eggs properly, and adapted to be revolved or turned at will about or with a horizontal axis, a mineral or chemical packing for such a revolving cooler or refrigerator, and a metallic lining in part or in whole, which not only serves to keep the eggs dry and cool, but also for keeping or assisting in keeping the mineral packing in place.

Figure 1 represents in perspective an apparatus embodying my invention and ready for use; Fig. 2, a transverse vertical section of the box or receptacle; Fig. 3, a fragmentary transverse section of a side or top of the box; Figs. 4, 5, details; and Fig. 6, a modification showing the slats.

A is the refrigerating case or box for holding the eggs, and which may be in any desired form, but preferably quadrangular in cross-section; and it is provided with journals or axes $b$ at each end, to permit it to be turned or revolved at will, these axes being adapted to rest in proper bearings in any proper support—as, for instance, in the frame or stand C—such support having appropriate notches or cuts $d$ for receiving the journals $b$, and having free space to permit the refrigerator or case to be revolved as needed from time to time. At one end of this case is made a series of depressions or shallow holes, $e$, arranged equally distant from the axis, and in the corresponding end of the stand is made a hole, $f$, extending through it, and a peg or pin, $g$, is provided, which, being put through the hole $f$ and pushed into any one of the depressions $e$, serves to hold the case to any given position to which it may have been turned, and upon being withdrawn and inserted into the next or any other depression $e$ secures it for the desired time in this changed position. In this way the inclosed eggs may be all inverted gradually or at once, or turned over to any degree desired.

The journals or arbors $b$ may be secured to the ends of the box in any suitable manner; but I prefer to make a shoulder or flange on their inner ends, so that they may be held to place by a batten or cleat, and on one of these arbors I place a crank and handle similar to a grindstone-crank, for the purpose of turning or rotating the box.

The box may be of any size or capacity required—say from two to four or even ten feet long—and adapted for holding or carrying from twenty-five to a hundred and twenty-five dozens, or even ten hundred dozens, of eggs.

The arbor may be made as shown in detail in Fig. 4.

For the purpose of providing space for and for holding the mineral or chemical packing in place between the exterior box, A, and its metallic interior lining, H, I use beveled slats $i$, arranged in the form of a frame, and secured against the inner walls and also against the bottom and cover of the box, these bevels inclining, as shown, so that when the mineral or chemical packing $j$ shall have been filled into the space between these slats while in its moist or plastic condition it will be, as it were, dovetailed to its place; or, in other words, that face or surface of the packing which is against the wood or material composing the box will have a larger area than the other surface of this packing. This packing should be of a character colder than the egg—such, for instance, as plaster-of-paris or sulphite of lime, cement, and sulphate of soda; or any other disinfecting mineral or chemical substance may be used for packing the rotating box and its lid or cover partially or entirely, which will preserve the proper temperature and moisture of the eggs. This packing, besides being cool and a preservative, is also a good non-conductor of heat, and the beveled slats keep it from cleaving off. I also, instead of the metallic lining or covering, sometimes use metal strips h to hold the mineral or chemical packing in place, and thereby leave such packing uncovered to a greater or less extent, and thus get the full benefit of the packing as a disinfectant for the eggs and preserve a more even and suitable temperature.

The linings H of the box and cover may be made of any desired sheet metal, preferably galvanized iron, and they may be secured, as shown, directly to the frame or slats i, thus not only covering, but also assisting to keep in its place the packing j and to prevent its scaling or rubbing off.

For holding the eggs, socket-boxes or racks K may be used, placed one on top of the other, each space or compartment in these racks being adapted to hold one egg, and these racks may reach up to the top of the box; and to provide for the removal of any one or more of the racks from the box, and yet permit the proper rotary motion of the box without risk of damage to the eggs, a follower may be placed inside of the box, connected with a screw extending up through the cover, and whereby this follower may be adjusted as needed to firmly hold the racks and eggs to place. Partitions may be placed, if desired, within the refrigerator-box.

The frame or stand within or upon which the box is supported and turns may be horizontal instead of vertical, and such that any desired number of boxes may be hung in one frame.

My invention is adapted for the transportation of eggs, and these boxes or refrigerators may be placed on railway-cars. In such cases, for the purpose of overcoming as far as practicable the shaking and jarring, rubber or spiral springs may be placed under the arbors of the box.

Tissue-paper may be used to advantage for wrapping the eggs before placing them in the box.

Each socket-box has not only the crossing partitions, but also a bottom attached to it, which not only separates the eggs of one layer from those of the next, but is also of a size such as to prevent the eggs or the layer of eggs from shifting endwise or sidewise of the box, and it also acts as a good non-conductor from one layer to another, and permits the ready lifting out at once of all the eggs in a given box.

When each layer of eggs is placed in the box the vacant spaces are filled in with appropriate dry filling material, such as corn-dust, shives from Western corn, rice-hulls, buckwheat hulls or chaff, cork-turnings, oat-chaff, &c.—and which should be free from oil and not likely to throw off an odor. The great essential is the adaptation for readily changing the position of the entire body of eggs, while at the same time keeping them cool.

I claim—

1. The described rotatable egg-preserver, having the interior cooling mineral packing, having interior means for holding each egg separately and firmly during a complete step-by-step revolution of the box, and having journals and a frame with journal-supports to permit complete revolutions, and devices for holding the box at any successive stated points of such revolution, substantially as set forth.

2. A rotatable egg-preserving air-tight box, hung on centers which are substantially in a horizontal line, and adapted to be turned thereon and held step by step during its complete revolution in vertical planes, to invert the egg partially at each step, and having a thick cooling or disinfectant mineral lining over the whole inside of the box, such lining being surfaced in whole or in part with metal, as shown and described.

ALBA R. P. ROBINSON.

Witnesses:
R. L. BALL,
A. McDONALD,
J. G. BELLOWS.